US008682788B2

(12) United States Patent
Neinast et al.

(10) Patent No.: US 8,682,788 B2
(45) Date of Patent: Mar. 25, 2014

(54) ELECTRONIC LOCKBOX IMPLEMENTATION AND MANAGEMENT

(75) Inventors: William H Neinast, Dallas, TX (US); Tera L Howe, Virginia Beach, VA (US); Gordon F Miller, Jr., Barrington, RI (US); Judith A Waldal, Antioch, IL (US); Louis A Hawkins, Charlotte, NC (US); Gerald Whitney Wilson, III, Mead, WA (US); Clement Mazgelis, Bolton, CT (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/452,306

(22) Filed: Apr. 20, 2012

(65) Prior Publication Data

US 2013/0185200 A1 Jul. 18, 2013

Related U.S. Application Data

(60) Provisional application No. 61/587,340, filed on Jan. 17, 2012.

(51) Int. Cl.
*G06Q 40/00* (2012.01)
(52) U.S. Cl.
USPC .............................. 705/40; 705/39

(58) Field of Classification Search
USPC ................................. 705/38, 40, 39
See application file for complete search history.

(56) References Cited

U.S. PATENT DOCUMENTS

| | | | |
|---|---|---|---|
| 2004/0188522 A1* | 9/2004 | Ashaari | 235/385 |
| 2006/0219601 A1* | 10/2006 | Babanats et al. | 209/3.3 |
| 2006/0253405 A1* | 11/2006 | Nirenberg | 705/401 |
| 2008/0103791 A1* | 5/2008 | Heiden et al. | 705/1 |
| 2008/0154751 A1* | 6/2008 | Miles | 705/28 |
| 2008/0158615 A1* | 7/2008 | Parkos et al. | 358/402 |
| 2009/0005901 A1* | 1/2009 | Stemmle et al. | 700/215 |
| 2009/0164662 A1* | 6/2009 | Mather | 709/243 |
| 2010/0153310 A1* | 6/2010 | Huebler | 705/408 |
| 2011/0098846 A1* | 4/2011 | Yeung et al. | 700/224 |

* cited by examiner

*Primary Examiner* — Lalita M Hamilton
(74) *Attorney, Agent, or Firm* — Banner & Witcoff, Ltd.; Michael A. Springs (57) ABSTRACT

Methods, computer readable media, and apparatuses for electronically sorting and managing mail within an electronic lockbox are described. Mail may be routed from a mail delivery service to a first location. The mail may be scanned at the first location and information may be extracted from the envelopes and items within the envelopes. The information may be verified and grouped into electronic transactions. The electronic transactions may be classified and sorted into batches based on identifiers contained within the information extracted from the mail. The batches of electronic transactions may be processed and information relating to the transactions may be stored.

21 Claims, 10 Drawing Sheets

ELECTRONIC LOCKBOX IMPLEMENTATION AND MANAGEMENT

CROSS-REFERENCE TO RELATED APPLICATIONS

The present application claims benefit to U.S. Provisional Application No. 61/587,340, filed Jan. 17, 2012, which is incorporated by reference herein in its entirety.

TECHNICAL FIELD

One or more aspects of the disclosure generally relate to computing devices, computing systems, and computer software. In particular, one or more aspects of the disclosure generally relate to computing devices, computing systems, and computer software that may be used by an organization, such as a financial institution or other entity, to electronically sort and manage mail sent to a lockbox.

BACKGROUND

Entities, such as financial institutions, provide a lockbox service for many of their clients. Generally, the clients that use the lockbox service are typically businesses that receive payments from their customers. For instance, when a customer pays a utility bill, such as a cable television bill, the customer sends the payment to a lockbox address, which may be, for example, a post office box. The financial institution, through an intermediate, such as a courier, regularly picks up the payments from the lockbox, opens them, scans them, and processes the payments for the financial institution's client. The lockbox service takes care of the entire process, from payment handling to crediting the client's account.

Currently, the U.S. Postal Service or other mail delivery service must physically carry each payment envelope to the physical lockbox address. Because the customers can be geographically diverse, this often means one or more days of delay between dropping off of the payment paper document and receiving the payment paper document at the lockbox address.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Some aspects as disclosed herein are directed to, for example, managing the lockbox service and reducing the delay between mailing a payment and crediting a client's account. Any type of lockbox may be contemplated within the scope of this invention. For example, the lockbox may be a wholesale lockbox, a retail lockbox, or a government lockbox. The lockbox service may include any type of remittance payment processing, for example, domestic payments may be processed or international payments may be processed.

Further aspects of the disclosure relate to methods, computer-readable media, and apparatuses for electronically sorting and managing mail within an electronic lockbox. For example, an organization, such as a financial institution, may utilize a lockbox to handle payments made to its clients. By implementing one or more aspects of the disclosure, an organization, such as a financial institution, may be able to efficiently process transactions and reduce the delay that a typical lockbox system experiences in waiting for mail to be delivered to a specific location and manually sorted.

According to one or more aspects, a plurality of envelopes may be received at a first location. The envelopes may be scanned, and a first set of information may be extracted from each of the envelopes. The items within the envelopes may be scanned and a second set of information may be extracted from the items within each of the envelopes. The first and second sets of information for each envelope may be compared to determine whether the first set of information and the second set of information correspond to each other. The first set of information and the second set of information for each envelope may be grouped or combined into an electronic transaction. Each of the electronic transactions may be classified by one or more identifiers contained within or otherwise associated with the first or second set of information. The electronic transactions may be sorted into batches in accordance with the one or more identifiers. Data representing the batches of electronic transactions may be sent to one or more electronic storage locations. The data representing the batches of electronic transactions may be processed by one or more processors at the electronic storage locations. The electronic storage locations may be remote from or near to the first location.

According to one or more further aspects, instructions may be provided to a mail delivery service to hold a plurality of envelopes addressed to one or more destinations. The held envelopes are received at a first location. At the first location, the envelopes and items within the envelopes may be scanned. Information may be extracted from the envelopes and from items contained within the envelopes. The information extracted from the envelopes and items within the envelopes may be grouped or combined into an electronic transaction for each of the envelopes. The electronic transactions may be classified and sorted by one or more identifiers within the extracted information. The electronic transactions may be sorted into batches of electronic transactions. The electronic transactions or batches of electronic transactions may be sent to one or more second locations to be processed. The second location may be remote or near to the first location.

Various aspects, as described herein, may reduce the delay normally experienced between depositing a physical payment document for mailing to a lockbox destination and crediting a client's account, by reducing or even eliminating the mail delivery process. This may be done by, for instance, intercepting specific mail addressed to one or more predetermined lockbox addresses and initially received at a post office or other mail delivery service, and processing the mail at a location near the post office or mail delivery service. Another advantage of the invention is that it reduces the time it takes to manually sort mail that arrives at a conventional lockbox by electronically sorting it the mail after the mail has been scanned. Because the mail may be scanned at a physical location that depends upon the point of origination rather than the destination address, the mail being scanned at a given physical location would not be expected to be already sorted by destination address. Thus, while sorting has conventionally been done in the physical realm, sorting may now be performed virtually—that is, by sorting the scanned electronic versions of the mail rather than the physical mail itself.

By reducing or eliminating the need to physically route and sort by destination address, a substantial amount of time between payment drop off and crediting to a lockbox client's account may be saved. This may be a lockbox service trait considered desirable by lockbox clients, and may provide a competitive advantage over other lockbox services that rely upon physical delivery and sorting.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Figure 1A:
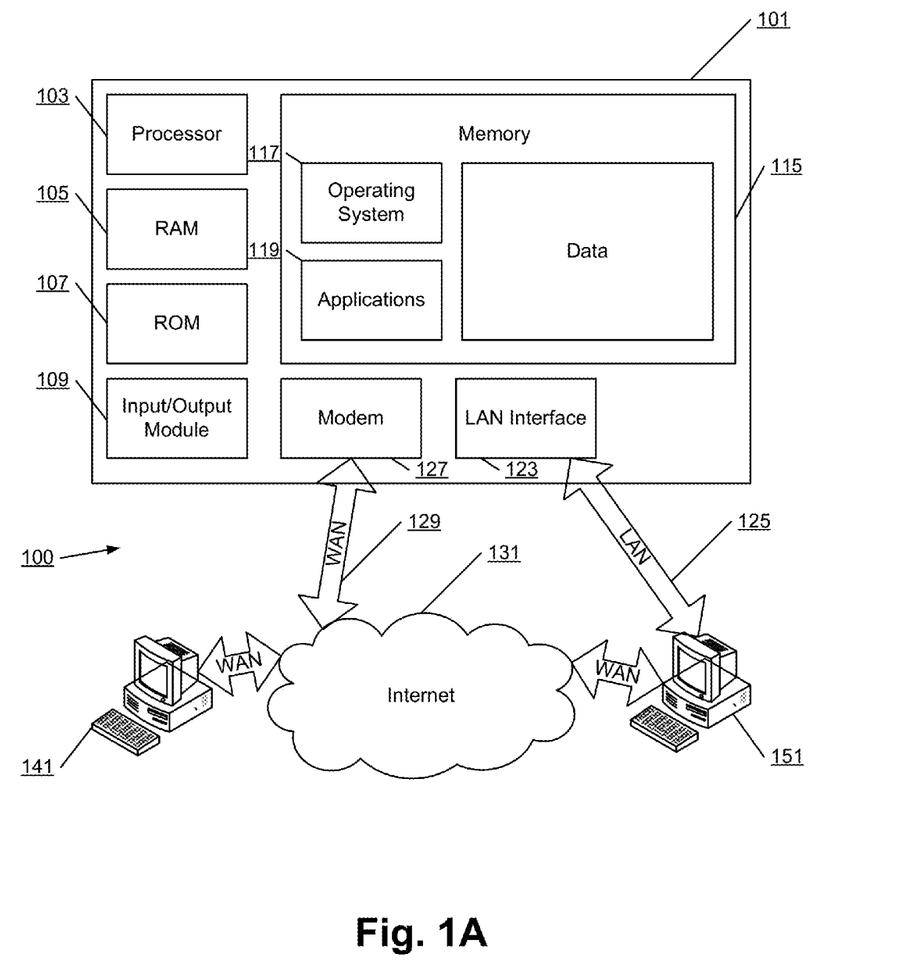
FIG. 1A illustrates an example operating environment in which various aspects of the disclosure may be implemented.

FIG. 1A illustrates an example block diagram of a computing device 101 (e.g., a computer server, desktop computer, laptop computer, tablet computer, and the like) in an example computing environment 100 that may be used according to one or more illustrative embodiments of the disclosure. The computing device 101 may have a processor 103 for controlling overall operation of the server and its associated components, including for example random access memory (RAM) 105, read-only memory (ROM) 107, input/output (I/O) module 109, and memory 115.

I/O module 109 may include, e.g., a microphone, mouse, keypad, touch screen, scanner, optical reader, and/or stylus (or other input device(s)) through which a user of computing device 101 may provide input, and may also include one or more of a speaker for providing audio output and a video display device for providing textual, audiovisual, and/or graphical output. Software may be stored within memory 115 and/or other storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown).

The computing device 101 may operate in a networked environment supporting connections to one or more remote computers, such as terminals 141 and 151. The terminals 141 and 151 may be personal computers or servers that include many or all of the elements described above with respect to the computing device 101. The network connections depicted in FIG. 1A include a local area network (LAN) 125 and a wide area network (WAN) 129, but may also include other networks. When used in a LAN networking environment, the computing device 101 may be connected to the LAN 125 through a network interface or adapter 123. When used in a WAN networking environment, the computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed. Computing device 101 and/or terminals 141 or 151 may also be mobile terminals (e.g., mobile phones, smartphones, PDAs, notebooks, and the like) including various other components, such as a battery, speaker, and antennas (not shown).

The disclosure is operational with numerous types of general purpose or special purpose computing devices. Examples of well-known computing devices that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1B:
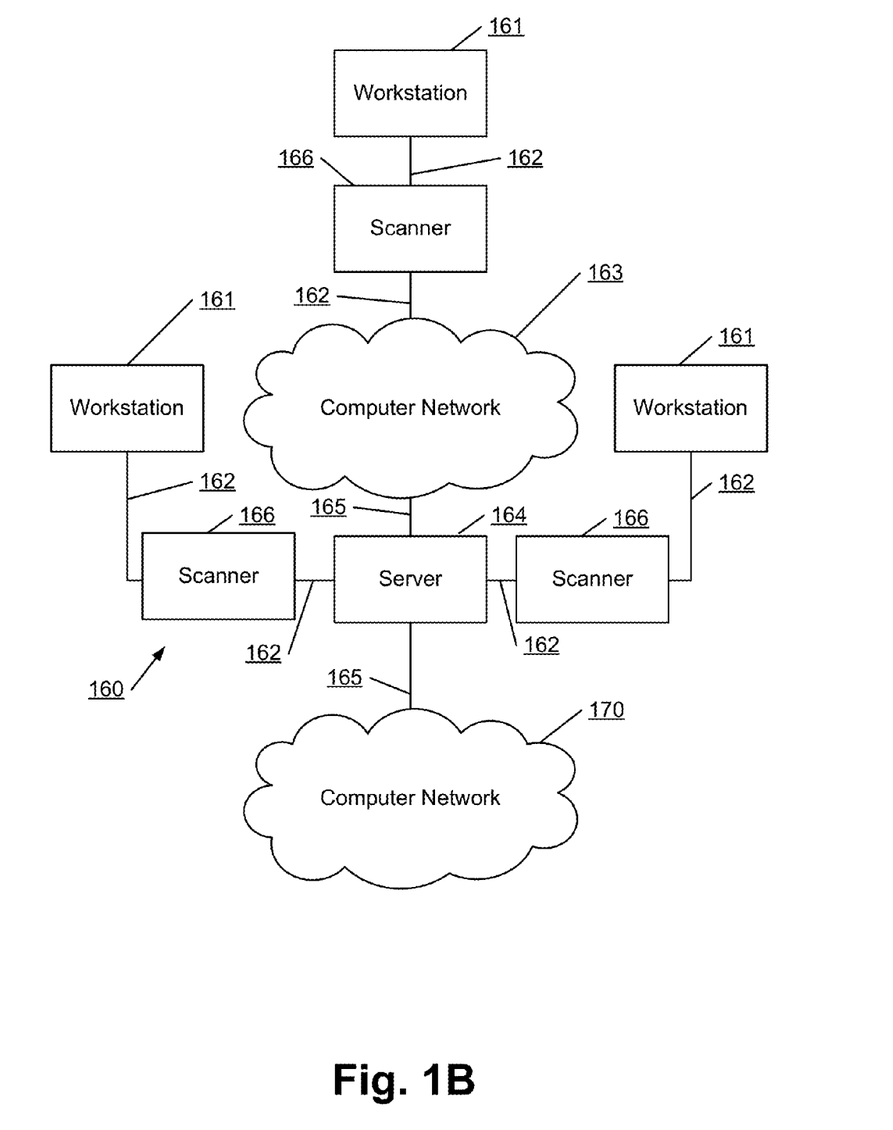
FIG. 1B illustrates another example operating environment in which various aspects of the disclosure may be implemented.

FIG. 1B illustrates another example operating environment in which various aspects of the disclosure may be implemented. As illustrated, system 160 may include one or more workstations 161. Workstations 161 may, in some examples, be connected by one or more communications links 162 to scanners 166. The scanners 166 may be connected by one or more communications links 162 to computer network 163 that may be linked via communications links 165 to server 164. In system 160, server 164 may be any suitable server, processor, computer, or data processing device, or combination of the same. Server 164 may be used to process the instructions received from, and the transactions entered into by, one or more participants.

According to one or more aspects, system 160 may be associated with (e.g., owned, controlled by, and/or physically located at the premises of) a financial institution, such as a bank. Various elements may be located within the financial institution and/or may be located remotely from the financial institution. For instance, one or more workstations 161 and scanners 166 may be located within a branch office of a financial institution. The workstations 161 and scanners 166 may be used, for example, by customer service representatives or other employees of the financial institution in conducting financial transactions or payment processing via network 163. Additionally or alternatively, one or more workstations 161 may be located at a remote location. The workstations 161 and scanners 166 also may be used in conducting financial transactions or payment processing via computer network 163 or computer network 170. The scanners 166 may be any type of scanner. For example, the scanner may be a desktop scanner, a stand-alone scanner, and/or a high speed scanner.

Computer network 163 and computer network 170 may be any suitable computer networks including the Internet, an intranet, a wide-area network (WAN), a local-area network (LAN), a wireless network, a digital subscriber line (DSL) network, a frame relay network, an asynchronous transfer mode network, an electronic private network (VPN), or any combination of any of the same. Communications links 162 and 165 may be any communications links suitable for communicating between workstations 161 and server 164, such as network links, dial-up links, wireless links, hard-wired links, and the like.

Figure 2:
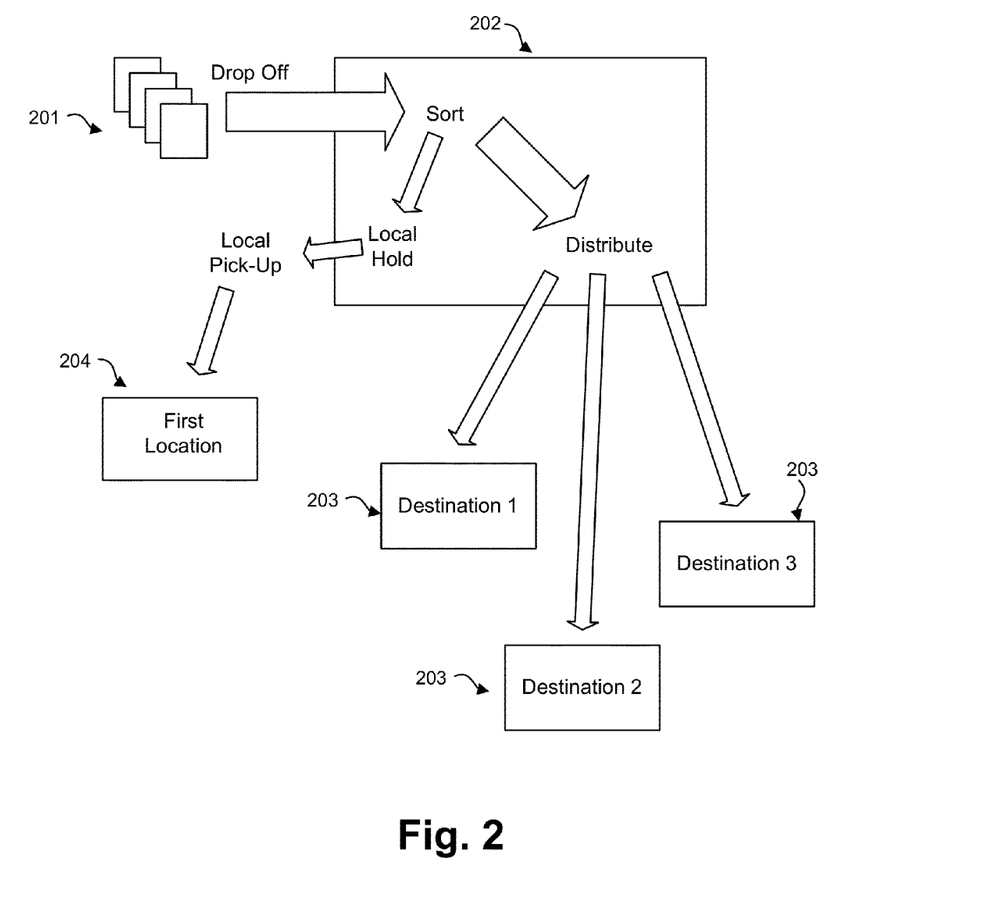
FIG. 2 illustrates an example of at least a portion of a flow diagram for routing mail to an electronic lockbox system according to one or more illustrative aspects described herein.

FIG. 2 illustrates at least a portion of a flow for routing mail to an electronic lockbox system 300. As illustrated in FIG. 2, mail 201 may be dropped off (such as by a payor) at a post office 202 (e.g., of the United States Postal Service), or other public or private mail delivery or courier service. At the post office 202, mail may be sorted and distributed to one or more destinations 203 in accordance with the destination address indicated on the items of mail. However, at least some items of mail 201 bearing a specific destination identifier, such as a specific destination address or portion thereof (e.g., a specific zip code or lockbox identifier), may be routed to a location different from the destination address indicated on each of those items of mail. For example, mail 201 addressed to one or more predetermined lockboxes having specific zip codes and/or lockbox identifier may be rerouted by the post office 202 to a first location 204. In this embodiment, the post office 202 may deliver the mail 201 to the first location 204. Alternatively, the post office 202 may hold the items of mail 201 at the post office 202 (or a send the mail 201 to a nearby post office) for pick up by a person or entity, such as a courier, who will deliver the mail 201 to the first location 204. The person or entity picking up the mail from the post office 202) may be, or be an agent of, the financial institution. In at least one embodiment, the first location 204 may be determined so as to be within a predetermined distance or predetermined geographical boundary of the post office 202. The predetermined distance may be any predetermined distance. For example, the first location 204 may be determined so as to be located within 5 miles, or within 10 miles, of the post office 202, or within the same city, or within the same state. Additionally or alternatively, mail 201 may be sent directly to the first location 204.

Figure 3:
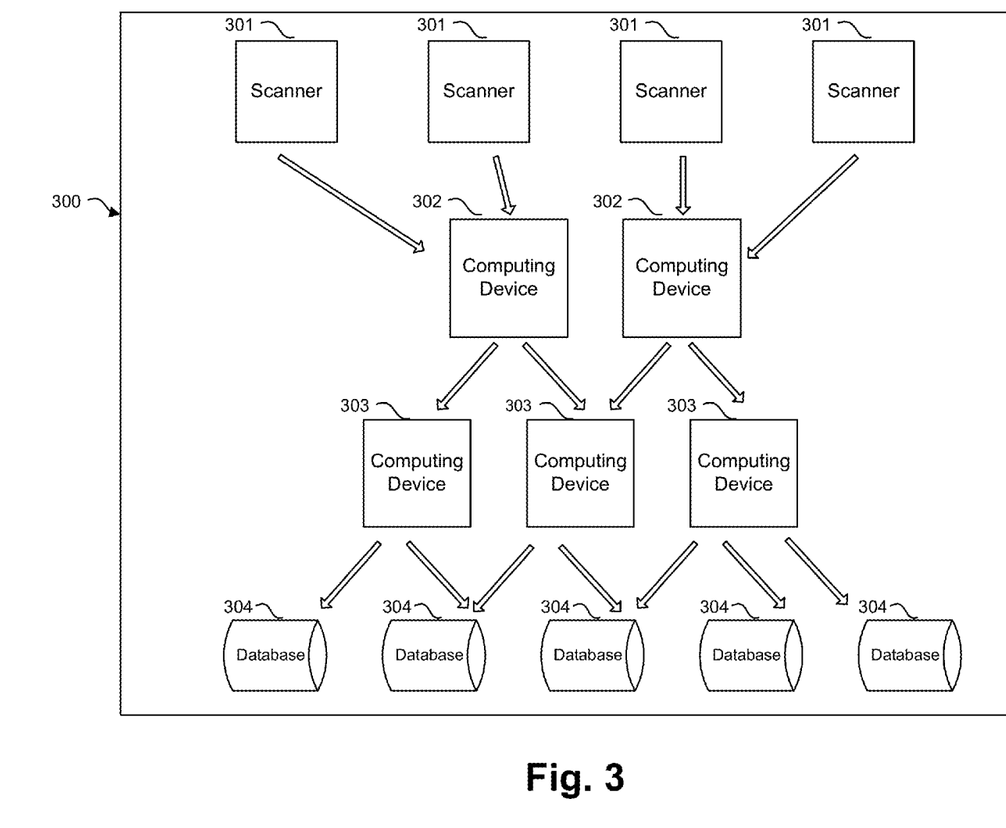
FIG. 3 illustrates an example electronic lockbox system according to one or more illustrative aspects described herein.

FIG. 3 illustrates an example electronic lockbox system 300 according to one or more aspects described herein. The electronic lockbox system 300 may be located at the first location 204 and may include one or more scanning devices (scanners) 301, one or more other computing devices (e.g., processors or servers) 302, 303, and one or more databases 304. The scanners 301 may correspond to the scanners 166 described with respect to FIG. 1B. Referring back to FIG. 3, the scanners 301 may scan images of the mail 201 received at the first location 204 (e.g., the held mail 201 that is picked up by the above-mentioned person or entity). Both the outer surface of the envelope and the contents of the envelope may be scanned by the scanners 301. Each envelope may contain any types of one or more documents. For example, each envelope may contain checks 412, coupons 411, and/or supplemental correspondence 413, as illustrated by way of example in FIGS. 4B-4E. Referring back to FIG. 3, the scanned images may be sent to one or more processors 302 by the scanners 301. The scanned images may be converted to text by the processors 302. The scanned images may, in turn, be converted to text in any suitable manner, such as through optical character recognition ("OCR"). Moreover, any magnetic ink (such as commonly used on checks) may be magnetically scanned by scanners 301 and interpreted using magnetic ink character recognition (ICR) techniques.

As discussed in further detail below, the information scanned from the mail 201 may be compared, verified and/or grouped or otherwise combined into electronic transactions by the processors 302. Additionally, the processors 302 may classify the electronic transactions. The processors 302 may also sort the electronic transactions and create batches of electronic transactions containing one or more of the same identifiers. The electronic transactions may be sent to additional processors 303 for processing. The processing of the transaction may include processing any type of transaction, such as crediting a client's account, debiting a client's account, sending a remittance, and/or storing correspondence, and the like. The additional processors 303 may be located in the first location 204 or may be remote from the first location 204. For instance, the additional processors 303 may be located near the recipient's address as indicated on the item mail 201 or near the pick-up location (e.g., near the post office 202). After at least some of the electronic transactions are processed, the processors 303 may send information representing or otherwise describing the transactions to the databases 304. The databases 304 may be configured to generate reports relating to the electronic transactions and/or to the accounts associated with the electronic transactions.

Figure 5:
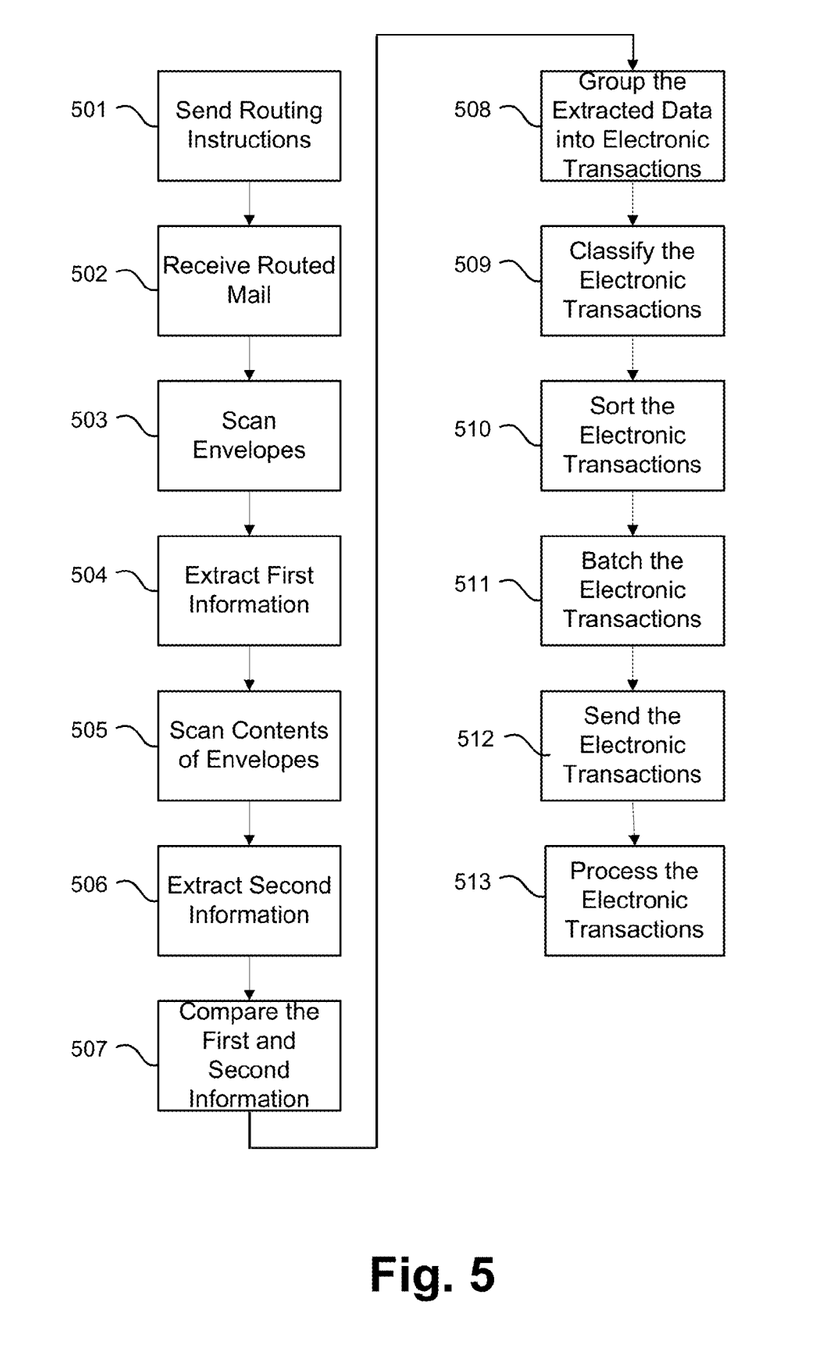
FIG. 5 illustrates an example of at least a portion of a flow diagram of a method of managing an electronic lockbox according to one or more illustrative aspects described herein.

FIG. 5 illustrates an example method of managing mail in an electronic lockbox system 300. According to one or more aspects, any and/or all of the methods described herein may be implemented by software executed on one or more computers, such as the computing device 101 of FIG. 1A, and/or by a computing system, such as system 160 of FIG. 1B. In some arrangements, the methods described herein may be performed by and/or in combination with a server (e.g., server 164).

Figure 4A:
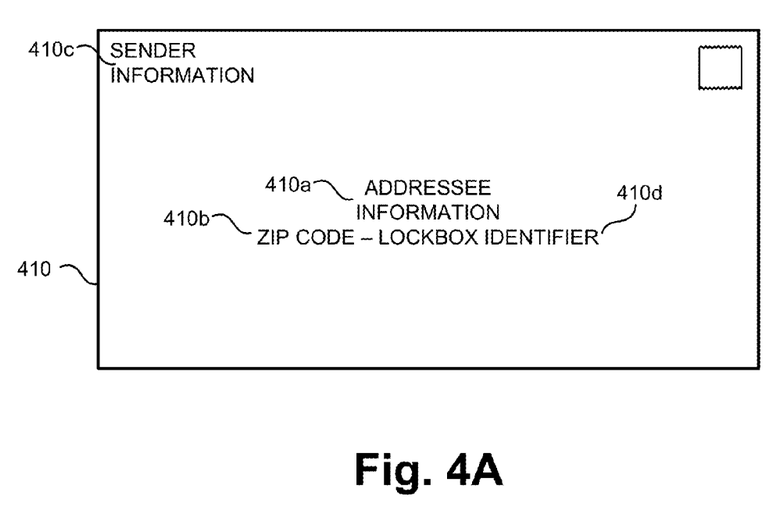
FIGS. 4A-4E illustrate example portions of mail received at an electronic lockbox system according to one or more illustrative aspects described herein.
Figure 4B:
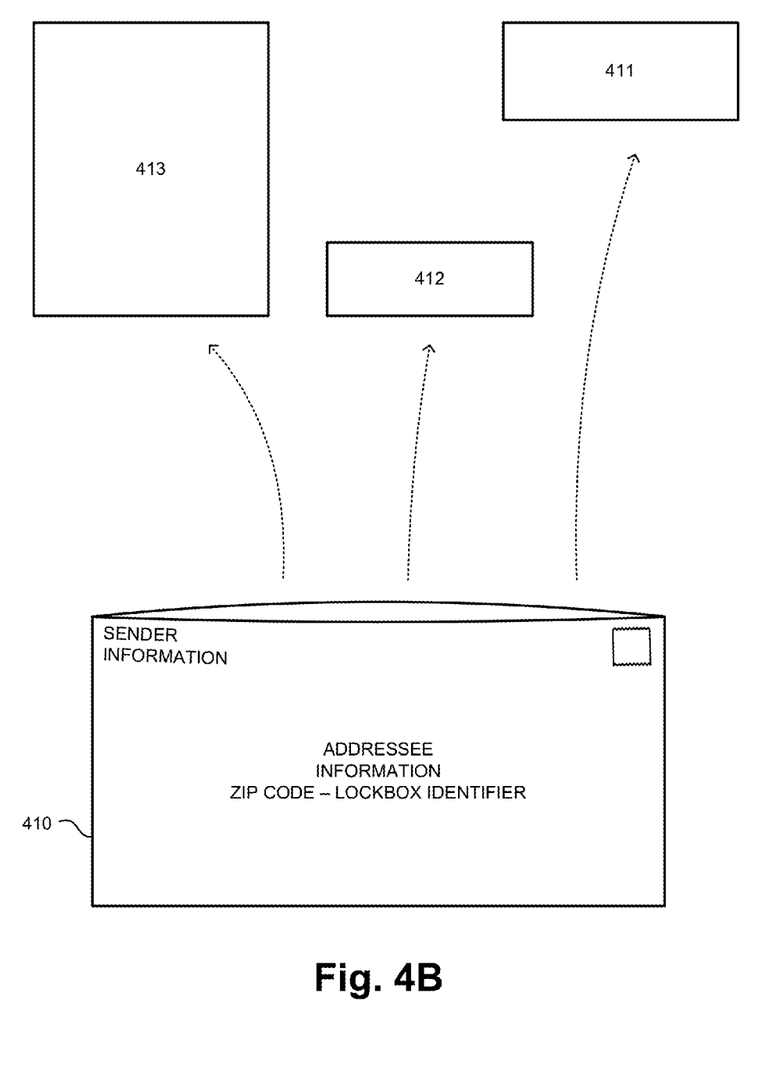

In step 501, instructions may be provided to a postal distribution center or post office 202 to route certain mail 201 to a first location 204 (which may include holding that mail 201 at the postal distribution center or post office 202 that originally received the mail 201). The mail 201 routed or held may be chosen based on information indicated (e.g., printed or written) on the outside of the envelope. For example, the mail 201 may be chosen based on a destination address 410a, a destination zip code 410b, or a lockbox identifier 410d indicated on the outside of the envelope, such as illustrated in FIG. 4A. Alternatively, the mail 201 may be chosen based on the sender's information 410c indicated on the outside of the envelope, such as also illustrated in FIG. 4A.

Referring back to FIG. 5, the routed mail 201 may be received at the first location 204, as illustrated in step 502. In at least one embodiment, the first location 204 may be near the post office 202 or may be near the location of the sender. The distance between the first location 204 and the post office 202 may be any predetermined distance, including zero. For example, the distance between the first location 204 and the post office 202 may be 5 miles or less, or it may be 10 miles or less. The first location 204 and the post office 202 may be within the same city or within the same state.

Figure 4C:
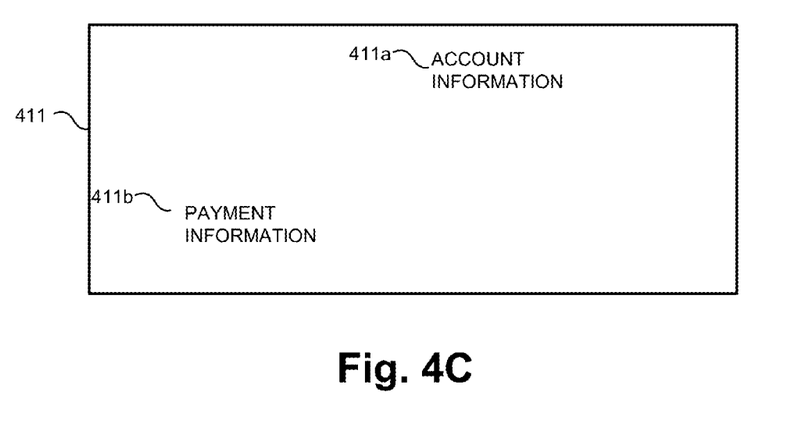
Figure 4D:
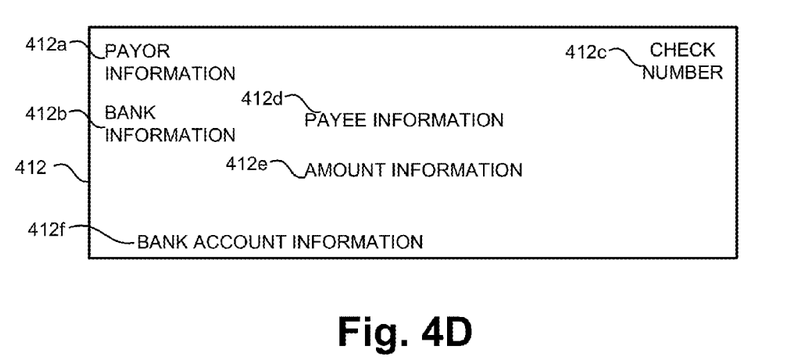
Figure 4E:
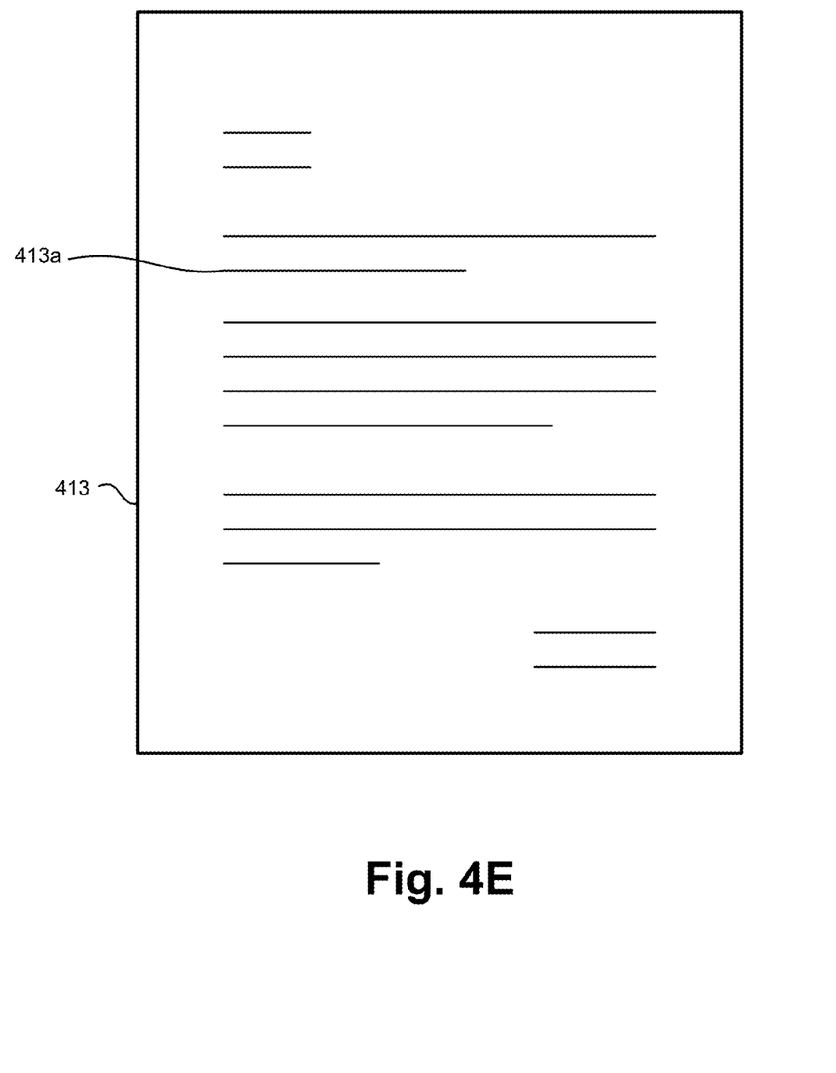

At the first location 204, mail 201 may be scanned. As illustrated in step 503, the received envelopes may be scanned by scanners 301. In at least one embodiment, the outer surface of each of the envelopes is scanned. In step 503, a first set of information may be extracted from the images each of the envelopes. The information may be extracted by processors 302. Any type of information may be extracted from the envelopes. For example, the envelopes may contain a destination address 410a, a destination zip code 410b, a destination lockbox identifier 410d, and/or the sender's information 410c, as illustrated in FIG. 4A. Referring back to FIG. 5, in step 505, the contents of each of the envelopes are scanned, such as by scanners 301. The envelopes may contain any type of documents, including checks 412, coupons 411, and/or supplemental correspondence 413, as illustrated in FIGS. 4C-4E. Referring back to FIG. 5, as illustrated in step 506, a second set of information associated with each of the envelopes may be extracted from the images and/or scanned magnetic ink of each the items within the envelopes. The second set of information may be extracted from the images by processors 302. Any type of information may be extracted from the items within the envelopes. For example, information such as the account information 411a, payment information 411b, payor information, 412a, bank information 412b, check number 412c, payee information 412d, amount information 412e, bank account information 412f, and/or supplemental information 413a, as illustrated in FIGS. 4C-4E, may be extracted. The extracted first and second sets of information for each of the envelopes may be converted into readable text and/or other symbols through any suitable method, such as OCR or ICR by the processors 302.

Referring back to FIG. 5, as illustrated in step 507, the first set of information may be compared to the second set of information for each of the envelopes to determine if the first and second sets of information are associated with each other as expected. The processors 302 may perform the comparison of the first and second sets of information. Any type of information within the first set of information and the second set of information may be compared. For example, the sender's information 410c may be compared to the account information 411a to determine if the two correspond to each other. In another example, the destination address 410a, destination zip code 410b, and/or destination lockbox identifier 410d may be compared with the account information 411a to determine if the account information 411a is routinely sent. Additionally, the first set of information and/or the second set of information may be verified by the processors 302, to determine the authenticity of the information. Any type information may be contained and verified in the second set of information. For example, if one of the items scanned was a check, the payee's signature may be verified to determine the authenticity.

If the first and second sets of information do not appear to correspond to each other, then the mail item may be set aside (electronically and/or physically) and flagged for manual review. If it is determined that the first set of data and the second data correspond with each other, the first set of data and the second set of data for each of the envelopes may be combined or otherwise grouped, by the processors 302, into an electronic transaction, as illustrated in step 508. This may result in a plurality of transactions (e.g. one electronic transaction for each envelope). In at least one embodiment, each of the plurality of electronic transactions may be classified, such as by the processors 302, as illustrated in step 509. The electronic transactions may be classified based on any criteria, such as based on information or an identifier within the first set of information and/or the second set of information. For example, the second set of information may indicate the type of payment received, such as a check or a remittance. In this example, the electronic transaction may be classified as either a "check" or a "remittance."

As illustrated in step 510, the electronic transactions may be sorted by processors 302. Thus, as previously discussed, an electronic "virtual" sort may be performed by processors 302 on the scanned unsorted physical mail, so that the physical mail need not ever be sorted by destination address. The electronic transactions may be sorted by any suitable criteria, such as by information contained within the first set and/or second set of information. For example, the electronic transactions may be sorted by information or identifiers within the first set of information, such as the destination address 410a, destination zip code 410b, destination lockbox identifier 410d, or the sender's information 410c. Additionally, or alternatively, the electronic transactions may be sorted by information or identifiers within the second set of information. For example, the electronic transactions may be sorted by the type of transaction, account information 411a, payment information 411b, payor information, 412a, bank information 412b, check number 412c, payee information 412d, amount information 412e, bank account information 412f, and/or supplemental information 413a. After the electronic transactions have been sorted, batches of electronic transactions may be created, as illustrated in step 511. Each of the batches of electronic transactions may include transactions having one or more of the same identifiers.

The batches of electronic transactions may be sent to one or more electronic storage locations, as illustrated in step 512. As illustrated in step 513, the batches of electronic transactions may be processed by processors 303. The electronic storage locations may be located anywhere. For example, the electronic storage locations may be located at the first location 204. Alternatively, the electronic storage locations may be located at a centralized location or at a location near the destination address 410a. In at least one embodiment, batches of electronic transactions having one or more common identifiers or information within the first set of information or the second set of information are sent to the same electronic storage location and processed on the same processor 303. Each batch of electronic transactions may be processed by a separate processor 303 or a plurality of the electronic transactions may be processed by the same processor 303.

Processing the electronic transactions may include processing any type of information contained in the second set of information. For example, the second set of information may include an amount that is deposited into a client's account and processing the transaction includes depositing the amount into the client's account. Alternatively, the second set of information may include a remittance that is sent to a third party and processing the transaction includes sending the remittance to the third party. The electronic transactions may be processed as a batch or the electronic transactions may be processed one at a time. In at least one embodiment, each batch of electronic transactions are processed together or at the same time.

Information relating to the electronic transactions may be stored in databases 304 for later retrieval and may be used to generate reports. Any type of information may be stored. For example, the type of transaction, payee information, payor information, the date of the transaction, and the amount of the transaction may be stored in databases 304. Additionally, any type of information relating to an account associated with the electronic transactions may also be stored in databases 304. For example, account balances or transaction histories for the accounts may be stored in databases 304.

As an illustrative example, suppose that ten people in City X mail or drop off payments to a post office 202. The mail 201 dropped off by the ten people are addressed to locations having zip codes and lockbox identifiers of ####1-###1, ####2-###2, or ####3-###3. Also suppose that the post office 202 has previously received instructions from a financial institution to hold mail 201 addressed to these three predetermined zip codes, and therefore holds the mail 210 addressed to those zip codes at the post office 202 location of receipt. An agent of the financial institution, such as a courier, is sent to the post office 202 to retrieve the mail 201. The courier takes the mail 201 to a first location 204. The first location may be a processing center for the financial institution at a location that depends upon the location of where the mail is held and/or picked up by the courier. The location of the processing center may be, for instance, approximately 5 miles or less from the post office 202. However, the processing center location may be anywhere desired. Moreover, there may be multiple processing centers distributed around a geographical area, such as distributed around a country.

At the first location 204 to which the held mail is brought by the courier, the mail 201 is scanned. Each of the ten envelopes 410 are scanned at the first location 204. The contents of each of the ten envelopes are also scanned at the first location 204. A first set of information, including a destination address 410a, a destination zip code 410b, a lockbox identifier 410d, and a sender's information 410c are extracted from each of the envelopes 410. A second set of information, including one or more of a type of transaction, an account information 411a, payment information 411b, payor information 412a, bank information 412b, check number 412c, payee information 412d, amount information 412e, bank account information 412f, and/or supplemental information 413a are extracted from the contents of each of the envelopes 410.

Figure 6:
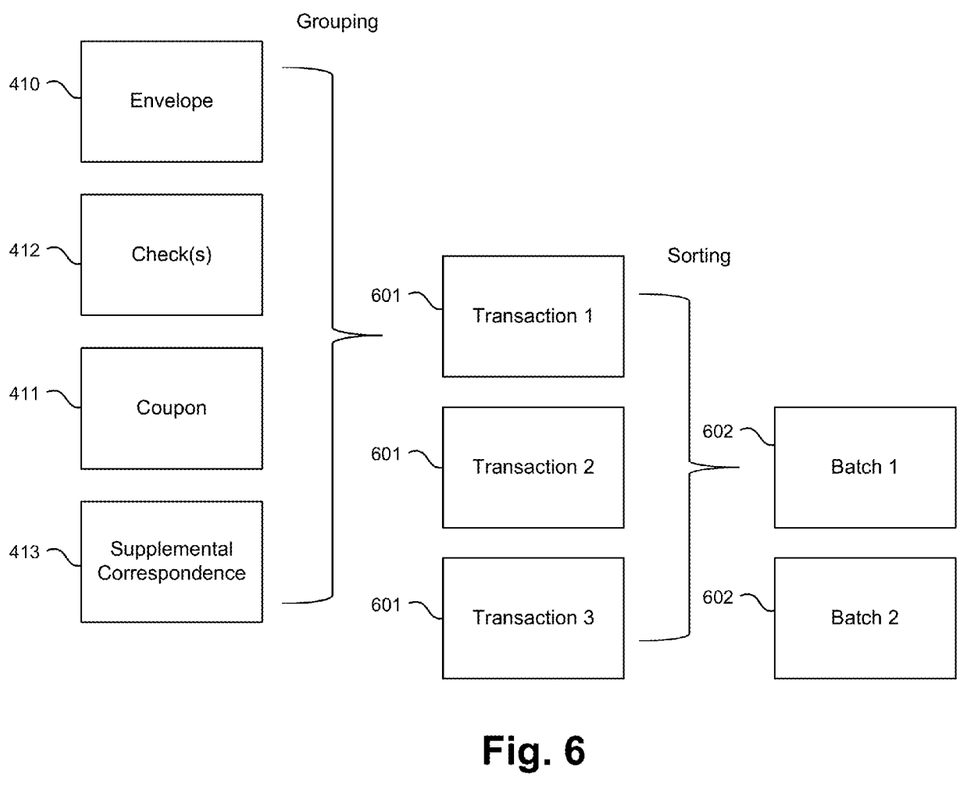
FIG. 6 illustrates an example of at least a portion of a flow diagram of managing an electronic lockbox according to one or more illustrative aspects described herein.

For each of the envelopes 410, the first set of information and second set of information are compared. In this example, the payee information 412d is compared to the destination address 410a. After it is determined that the first set of information and the second set of information for each of the envelopes 410 correspond with each other, the first set of information and second set of information extracted from the envelope and the items within each of the envelopes are combined or grouped into an electronic transaction, as illustrated in FIG. 6. In this example, an electronic transaction 601 would be created for each of the envelopes 410, resulting in ten electronic transactions 601.

The electronic transactions 601 are then sorted and batched. The electronic transactions 601 may be sorted by any identifier contained in the first set of information or the second set of information. In this example, the electronic transactions are sorted and batched by the destination lockbox identifier 410d. Thus, in this example, three batches 602 would be created (e.g. one batch for each of the three lockbox identifiers). The three batches 602 of electronic transactions may be sent to one or more second locations for processing. In this example, each of the batches 602 is sent to a second processing location near the respective destination zip codes 410b. For example, the batch containing transactions having a destination zip code of ####1 are processed at a processing center near zip code ####1. Thus, the batches containing destination zip codes of ####2 and ####3 are processed at a processing center near their respective destination zip codes 410b. For each batch of electronic transactions, the electronic transactions within the batch are processed at the same time.

In another illustrative example, suppose that ten people in City X mail or drop off payments to a post office 202. The mail 201 dropped off by the ten people are addressed to locations having zip codes and lockbox identifiers of ####1-###1, ####2-###2, or ####3-###3. Also suppose that the post office 202 has received instructions from a financial institution to route mail 201 addressed to these three zip codes and lockbox identifiers to a first location. The first location may be a processing center for the financial institution located approximately 10 miles from the post office 202.

At the first location 204, the mail 201 is scanned. Each of the ten envelopes 410 are scanned at the first location 204. The contents of each of the ten envelopes are also scanned at the first location 204. A first set of information, including a destination address 410a, a destination zip code 410b, and a sender's information 410c are extracted from each of the envelopes 410. A second set of information, including one or more of a type of transaction, an account information 411a, payment information 411b, payor information 412a, bank information 412b, check number 412c, payee information 412d, amount information 412e, bank account information 412f, and/or supplemental information 413a are extracted from the contents of each of the envelopes 410.

For each of the envelopes 410, the first set of information and second set of information are compared. In this example, the payor information 412a is compared to the sender information 410c. Additionally, the second set of information may be verified. In this example, the bank information and bank account information are verified to determine if the payment is valid or unauthorized. Further, the type of transaction may be classified. In this example, all of the payments are checks, and are classified as such.

Next, the first set of information and second set of information extracted from the envelope and the items within each of the envelopes are combined or grouped into an electronic transaction, as illustrated in FIG. 6. In this example, an electronic transaction 601 would be created for each of the envelopes 410, resulting in ten electronic transactions 601.

The electronic transactions 601 are then sorted (the above-mentioned virtual sort) and batched. The electronic transactions 601 may be sorted by any identifier contained in the first set of information or the second set of information. In this example, the electronic transactions are sorted and batched by the payee information 412d. Thus, in this example, three batches 602 would be created (e.g. one batch for each three different payees). The three batches 602 of electronic transactions may be sent to one or more second locations for processing. In this example, the second location is one or more processors at the first location 204. In this example, each of the batches may process on a different processor within the first location 204. For each batch of electronic transactions, the electronic transactions within the batch are processed at the same time.

Thus, mail addressed to a predetermined destination address characteristic (e.g., zip code, lockbox, and the like) may be held by the post office or routed to a location that depends upon the location at which the mail is deposited with the post office, and not necessarily depending upon the destination address indicated on the mail envelope. As previously explained, this may save time in that the mail need not be routed to its destination and need not be physically sorted by destination. Rather, the mail may be scanned at a location that depends upon the point of receipt by the post office, and then the data obtained from the scanning may be sorted and batched in a virtual manner rather than a physical manner.

Various aspects described herein may be embodied as a method, an apparatus, or as computer-executable instructions stored on one or more non-transitory and/or tangible computer-readable media. Accordingly, those aspects may take the form of an entirely hardware embodiment, an entirely software embodiment (which may or may not include firmware) stored on one or more non-transitory and/or tangible computer-readable media, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method, comprising:
    instructing a mail delivery service to hold all envelopes addressed to a destination address;
    receiving a plurality of held envelopes at a first location;
    extracting, by at least one processor, a first set of information from an exterior surface of each of the plurality of held envelopes;
    extracting, by the at least one processor, a second set of information from one or more items contained within each of the plurality of held envelopes;
    determining, for each of the held envelopes, whether the first set of information corresponds with the second set of information;
    determining, for each of the held envelopes, the authenticity of the second set of information;
    grouping, for each of the held envelopes, by the at least one processor, the first set of information with the second set of information to generate a plurality of electronic transactions; and
    processing, by the at least one processor, the plurality of electronic transactions.

2. The method of claim 1, further comprising:
    prior to processing the plurality of electronic transactions, sorting one or more of the plurality of electronic transactions by one or more identifiers contained within the first set of information or the second set of information and creating one or more batches of electronic transactions, each having one or more of the same identifiers; and
    sending, by a first processor, the one or more batches of electronic transactions having the same identifier to one or more second processors.

3. The method of claim 2, wherein the one or more batches of electronic transactions having the same identifier are sent to a second location to be processed by the one or more second processors.

4. The method of claim 3, wherein the second location is remote from the first location.

5. The method of claim 3, wherein the second location is located within a predetermined distance of the destination address for each of the plurality of held envelopes.

6. The method of claim 2, further comprising:
    processing at the same time, by the one or more second processors, the one or more batches of electronic transactions having the same identifier.

7. The method of claim 2, wherein one or more batches of the electronic transactions are processed by the one or more second processors at the first location.

8. The method of claim 1, wherein the first set of information includes a zip code and the first location is remote from the zip code.

9. The method of claim 1, wherein the first set of information includes an origin address and the first location is within a predetermined distance of the origin address.

10. The method of claim 1, wherein the plurality of electronic transactions are processed at the first location.

11. The method of claim 1, wherein the one or more items within each of the plurality of envelopes contains one or more of a check, a coupon, or supplemental correspondence.

12. The method of claim 1, wherein the second set of information includes at least an account number and an amount to credit to an account.

13. The method of claim 1, wherein the second set of information includes bank information and bank account information to be authenticated to determine if a payment is valid.

14. The method of claim 1, wherein the first set of information contains a destination address and the second set of information contains a customer identification.

15. The method of claim 14, wherein the customer identification contains a customer location 16. The method of claim 15, wherein the second location is a location within a predetermined range of the customer location.

17. The method of claim 1, further comprising
    sending, by the at least one processor, information describing the plurality of electronic transactions to a database wherein the database generates reports regarding the plurality of electronic transactions.

18. The apparatus of claim 17, wherein the memory stores additional computer-readable instructions that, when executed by the at least one processor, further causes the system to:
    prior to processing the plurality of electronic transactions, sort one or more of the plurality of electronic transactions by one or more identifiers contained within the first set of information or the second set of information and create one or more batches of electronic transactions, each having one or more of the same identifiers; and
    send, by a first processor, the one or more batches of electronic transactions having the same identifier to one or more second processors.

19. An apparatus comprising
    at least one processor; and
    memory storing computer readable instructions that, when executed by the at least one processor, cause the apparatus to:
        instruct a mail delivery service to hold all envelopes addressed to a destination address;
        receive a plurality of held envelopes at a first location;
        extract, by at least one processor, a first set of information from an exterior surface of each of the plurality of held envelopes;
        extract, by the at least one processor, a second set of information from one or more items contained within each of the plurality of held envelopes;
        determine, for each of the held envelopes, whether the first set of information corresponds with the second set of information;
        determine, for each of the held envelopes, the authenticity of the second set of information;
        group, for each of the held envelopes, by the at least one processor, the first set of information with the second set of information to generate a plurality of electronic transactions;
        process, by the at least one processor, the plurality of electronic transactions.

20. A non-transitory computer-readable medium having computer executable instructions that, when executed, cause at least one computing device to:

instruct a mail delivery service to hold all envelopes addressed to a destination address;

receive a plurality of held envelopes at a first location;

extract, by at least one processor, a first set of information from an exterior surface of each of the plurality of held envelopes;

extract, by the at least one processor, a second set of information from one or more items contained within each of the plurality of held envelopes;

determine, for each of the held envelopes, whether the first set of information corresponds with the second set of information;

determine, for each of the held envelopes, the authenticity of the second set of information;

group, for each of the held envelopes, by the at least one processor, the first set of information with the second set of information to generate a plurality of electronic transactions;

process, by the at least one processor, the plurality of electronic transactions.

21. The non-transitory computer-readable medium of claim 20, having additional computer executable instructions that, when executed by the at least one computing device, further cause the at least one computing device to:

prior to processing the plurality of electronic transactions, sort one or more of the plurality of electronic transactions by one or more identifiers contained within the first set of information or the second set of information and create one or more batches of electronic transactions, each having one or more of the same identifiers; and send, by a first processor, the one or more batches of electronic transactions having the same identifier to one or more second processors.

* * * * *